May 18, 1965  W. J. PENTESCO  3,184,101
PAIL HANDLE
Filed Sept. 13, 1962
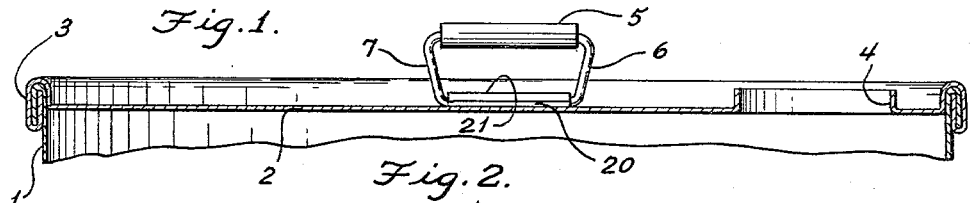
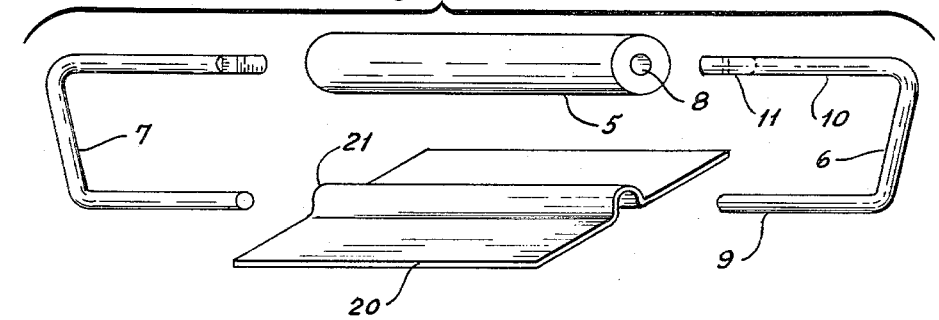
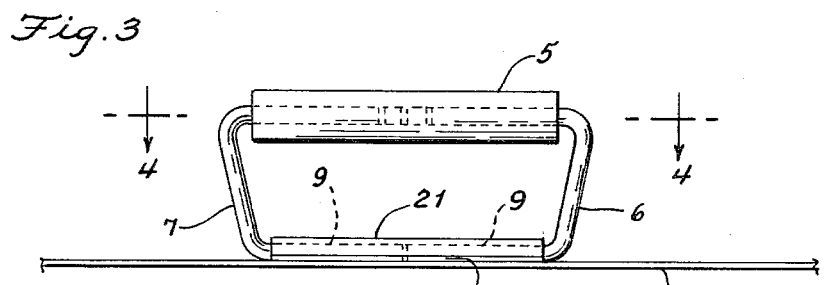
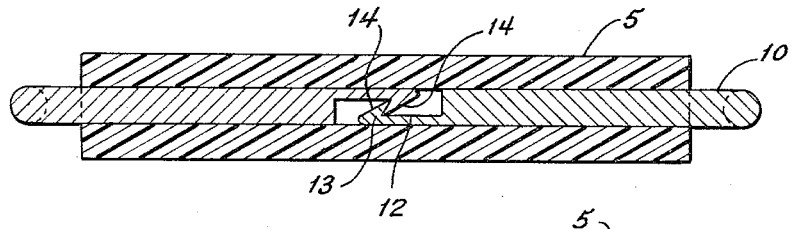
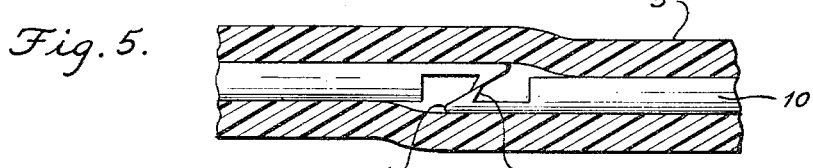
INVENTOR.
WALTER J. PENTESCO
BY
*Albert M. Parker*
ATTORNEY.

3,184,101
PAIL HANDLE
Walter J. Pentesco, St. Catharines, Ontario, Canada, assignor to American Flange & Manufacturing Co. Inc., New York, N.Y., a corporation of Delaware
Filed Sept. 13, 1962, Ser. No. 223,472
5 Claims. (Cl. 220—94)

This invention relates to pail handles and methods of applying the same and is particularly concerned with the provision of handles used on tight head containers which handles can be applied after the container has been otherwise completed and prepared for filling.

The advantage of surrounding wire pail handles with wooden handles to promote ease of handling has long been recognized and led to the widespread use thereof. However it was not until relatively recently that plastic handles have been similarly employed. Such handles are simply molded in a tubular form of a synthetic plastic, of which polyethylene is a nonlimiting example, and slipped over the wire from which the handle is subsequently formed for attachment to the pail head by means of a clip commonly spot welded thereto.

It has further been the common practice in the art to paint or lacquer such pails after they have been fabricated and subject them to the elevated temperature of a drying or baking oven to effect a cure of such coating. Obviously the plastic handle would melt giving rise to a problem which the instant invention is intended to overcome.

One attempt to solve this problem has been to secure the handle and clip assembly to the container head after the container is in its finished condition. However if the clip is secured to the container head by means of spot welding, marring or blistering of the finish will occur rendering the container unacceptable from the standpoint of appearance. Alternative securing means have been tried such as riveting but this method also damages the finish and in addition is slower and subject to leakage.

Another attempt to solve this handle melt problem has been to spot weld the clip alone to the container head before the painting operation and subsequently secure thereto a wire handle having a plastic grip by simultaneously forming the handle and inserting the ends thereof within the clip. This method is comparatively slow making it unsatisfactory for economic reasons and further, not only is the container head scratched in the securing operation, but the handle itself becomes distorted resulting in an unsightly finished product.

Other possible solutions to this problem embody the idea of providing a break in the grip such as a straight longitudinal slit or a spiral slit so that the grip can subsequently be secured to the handle. These efforts so far, however, have resulted in either a handle which comes apart in use or else an arrangement involving a too long and costly securing operation.

This application discloses a new and novel pail handle and a method for attachment to a pail, which handle is connected to a clip of the type commonly employed after the latter has been fastened to the pail cover and the assembly painted and cured, thus completely overcoming the prior art difficulties discussed above. This has been accomplished by providing a wire handle in two U-shaped pieces, which have their respective pairs of legs inserted in the openings at either end of the clip and in the open ends of the plastic grip when the clip and grip are held in spaced parallel relationship. The handle members overlap within the grip and have cooperating locking means to prevent subsequent withdrawal of the wire handle members from the grip. The handle of this invention has been found to be fully as strong as a solid handle while at the same time the handle and method of attachment disclosed herein provide a sorely needed solution to the handle melt problem.

It is accordingly a principal object of this invention to provide a pail handle which can be attached to a pail after the latter has been otherwise completely fabricated.

Another object is to provide a pail handle which can be easily and quickly attached to a painted or lacquered pail without damaging the finish thereon.

A further object is to provide a pail handle which can be hand applied to a container head having a conventional clip secured thereto.

A still further object is to provide a two-piece wire pail handle having a plastic grip which will meet acceptable strength requirements.

A more detailed object is to provide a two-piece wire pail handle having a plastic grip wherein the two pieces are of identical configuration so as to facilitate manufacture and assembly.

A still further object is to provide an improved method of attaching a handle assembly to a container wall.

Further and more detailed objects will in part be obvious and in part be pointed out as the description of the invention, taken in conjunction with the accompanying drawing, proceeds.

In that drawing:

FIG. 1 is a part elevation-part sectional view of a container top having a handle attached thereto in accordance with the invention.

FIG. 2 is an exploded view of the pail handle assembly.

FIG. 3 is a part elevation-part cross-sectional view of the pail handle assembly.

FIG. 4 is an enlarged section taken on lines 4—4 of FIG. 3 and looking in the direction of the arrows.

FIG. 5 is a fragmentary sectional view similar to FIG. 4 showing the handle members just prior to locked position.

Referring first to FIG. 1, the cylindrical side wall of a container is indicated by the numeral 1, and the head thereof by numeral 2. These parts are secured together by a conventional double seam joint 3. The head 2 is formed with an opening surrounded by an upstanding neck 4 which is adapted to receive a closure fitting of any type commonly known in the art and through which the contents of the container may be dispensed.

FIG. 2 illustrates an exploded view of the handle of the present invention wherein numeral 5 indicates a tubular hand grip molded from a resilient material of which polyethylene plastic is a non-limiting example. The handle itself comprises two rigid U-shaped members 6 and 7 formed from heavy wire or rod-like material of a diameter substantially equal to the diameter of the opening 8 in the grip 5. To facilitate ease of manufacture and assembly as hereinafter described, the two members 6 and 7 are of identical configuration consequently only one need be described in detail. Each U-shaped handle member has a lower leg 9 and an upper leg 10 as viewed in FIG. 2. The terminal portion of the upper leg 10 is provided with an interlocking portion having the form of a hook and generally indicated by the numeral 11. As shown in detail in FIG. 4, the hook has its mouth 12 opening in the plane of the U-shaped member. The head 13 of the hook has an inclined surface 14 which slopes away from the mouth 12 toward the end of the leg.

The head of the container has attached thereto, such as by spot welding, a clip 20 having a substantially semi-cylindrical upstanding rib 21 formed therein. As can be seen in FIG. 3, the clip 20 is adapted to tightly confine the lower legs 9 of the U-shaped members 6 and 7 in the opening between the rib 21 and the upper surface of the drum head 2.

The handle is assembled on the drum head by inserting the pair of legs 9 within the ends of the clip rib 21 and the pair of legs 10 within the hollow grip opening 8. The two handle members 6 and 7 are then urged toward each other and, as shown in FIG. 5, the interlocking portions of the legs 10 forced apart by the interaction of the inclined surfaces 14. The resilient nature of the grip 5 allows the same to expand sufficiently permitting the respective heads 13 to move past each other so that the interlocking portions 11 assume the position shown in FIG. 4. From this view, it can be seen that the depth of the mouth 12 is substantially equal to the thickest portion of the head 13 and the length of the mouth is substantially the same as the length of the head so the outside diameter of the interlocked portions is the same as that of a single thickness of either of the members 6 and 7. With this relationship the two hooks fit snugly within each other allowing the grip to contact back to its original shape. Further in FIGS. 4 and 5, it can be seen that the wall of the mouth 12 adjacent the head 13 is slightly undercut as indicated at 15 so that the two handle members cannot be longitudinally withdrawn from the grip 5. To prevent any gouging of the inner surface of the grip, the heads 13 of the hooks terminate in a slightly rounded formation 16.

With the product and method disclosed by the instant invention, it is possible for the container manufacturer to completely fabricate the container including attachment of the clip 20 to the head whereupon the container can be painted and put through a drying oven. After the container is completely finished, the U-shaped handle members 6 and 7 can be easily fastened within the clip 20 and the grip 5 by simply urging the handle members from the position of FIG. 2 to that of FIG. 3. Any tendency of the grip 5 to bend under a load due to the joint between the legs 10 is effectively resisted by the restraining action of the legs 9 which are tightly held between the rib 21 and the head 2. By having the mouths 12 opening in the plane of the handle members, not only is the cost of manufacture greatly reduced in that the two members are identical, but in addition the securing of the handle to the container head is greatly facilitated by not having to distinguish between right and left handle members.

It is understood that since changes in carrying out the above method and modifications in the product which embody the invention may be made without departing from its scope, it is intended that all matter contained in the above description, or shown in the accompanying drawing, shall be interpreted as illustrative and not in a limiting sense.

Having described my invention what I claim is new and desire to secure by Letters Patent is:

1. Pail handle construction comprising two generally U-shaped rod-like members, each providing a pair of legs, one leg of each U-shaped member adapted for lengthwise engagement with a container wall, the free end portion of each of said other legs terminating in an integral interlocking means said end portions positioned in interlocking relationship, and a resilient radially expandable tubular hand grip closely surrounding and engaging the said interlocked end portions of said other legs whereby said other legs are retained in interlocked relationship.

2. Pail handle construction comprising two identical generally U-shaped rod-like members, each providing a pair of legs, one leg of each U-shaped member adapted for lengthwise engagement with a container wall, the free end portion of each of said other legs terminating in a integral interlocking means being in the form of a hook having a head and a mouth, said mouth extending longitudinally inwardly from said head and opening in the plane of said U-shaped member, and a resilient expandable tubular hand grip closely surrounding said other legs whereby said other legs are retained therewithin by direct interengagement of said respective interlocking means.

3. Pail handle construction as in claim 2, said hook head having an inclined surface sloping away from said hook mouth toward said free end, said respective inclined surfaces provided a camming action which initially radially expands said resilient grip as said legs of said U-shaped members in overlapped relationship are urged axially toward their interlocked position.

4. In container construction a wall, a clip having an elongated hollow rib secured to said wall, two generally U-shaped rod-like members, each providing a pair of legs, one leg of each member axially confined within said rib, the free end portion of each of said other legs, terminating in an integral interlocking means said end portions positioned in interlocking relationship, and a resilient radially expandable tubular hand grip closely surrounding and engaging the said interlocked end portions of said other legs whereby said other legs are retained in interlocked relationship.

5. In a container construction, a wall, a clip having an elongated hollow rib permanently fastened to said wall, two generally U-shaped rod-like members of identical configuration and each providing a pair of legs, one leg of each member axially confined within said rib, the free end portion of each of said other legs terminating in an integral interlocking means being in the form of a hook having a head and a mouth, said mouth extending longitudinally inwardly from said head and opening in the plane of said U-shaped member, and a resilient radially expandable tubular hand grip surrounding said other legs whereby said other legs are retained therewithin by direct interengagement of said respective interlocking means so as to prevent axial withdrawal of said legs from said clip.

References Cited by the Examiner
UNITED STATES PATENTS

| | | | |
|---|---|---|---|
| 1,004,683 | 10/11 | Pritchard et al. | 220—95 |
| 1,040,944 | 10/12 | Hart et al. | 16—126 |
| 1,263,428 | 4/18 | Kaufman | 220—94 |
| 1,315,376 | 9/19 | McDonald | 16—126 |
| 1,506,694 | 8/24 | Toffey | 16—126 |
| 1,598,837 | 9/26 | White | 215—100 |
| 2,177,554 | 10/39 | Stiff | 16—127 |
| 2,659,928 | 11/53 | Eggerss | 16—126 |
| 2,672,103 | 3/54 | Hohmes | 16—126 |

THERON E. CONDON, *Primary Examiner.*

EARLE J. DRUMMOND, *Examiner.*